United States Patent [19]

Schlund et al.

[11] Patent Number: 5,707,913

[45] Date of Patent: Jan. 13, 1998

[54] AMIDINATO CATALYST SYSTEMS FOR THE POLYMERIZATION OF OLEFINS

[75] Inventors: Rüger Schlund, Ludwigshafen; Martin Lux, Dannstadt-Schauernheim; Frank Edelmann, Magdeburg; Ulrike Reissmann, Northeim; Wolfgang Rohde, Speyer, all of Germany

[73] Assignee: BASF Aktiengesellschaft, Ludwigshafen, Germany

[21] Appl. No.: 469,356

[22] Filed: Jun. 6, 1995

[51] Int. Cl.$^6$ .............. B01J 31/00; B01J 37/00; C08G 4/02; C08F 4/60

[52] U.S. Cl. .............. 502/102; 502/103; 502/117; 502/123; 502/200; 556/35; 556/42; 556/51; 556/57; 534/15; 526/159; 526/134; 526/161; 526/164; 526/169

[58] Field of Search .............. 502/102, 103, 502/117, 123, 200; 556/35, 42, 51, 57; 534/15

[56] References Cited

U.S. PATENT DOCUMENTS

| | | | |
|---|---|---|---|
| 3,374,256 | 3/1968 | Driscoll et al. | 534/15 |
| 5,318,935 | 6/1994 | Canich et al. | 502/117 |
| 5,502,128 | 3/1996 | Flores et al. | 526/160 |
| 5,527,752 | 6/1996 | Reichle et al. | 526/160 |

FOREIGN PATENT DOCUMENTS 675138  10/1995  European Pat. Off.

OTHER PUBLICATIONS

H.W. Roesky et al., Chem. Ber., vol. 121, pp. 1403–1406, 1988.
K. Dehnicke et al., J. Organomet. Chem., vol. 352, pp. C1–C4, 1988.
M. Wedler et al., J. Organomet. Chem., vol. 388, pp. 21–45, 1990.
W.A. Nugent et al., Coord. Chem. Rev., vol. 31, pp. 123–175, Feb. 1980.
K. Dehnicke, Chemiker–Zeitung, vol. 114, No. 10, pp. 295–304, Oct. 1990.
F. Edelmann et al., Z. Naturforsch., vol. 46b, pp. 1328–1332, 1991.
B. Novak et al., Macromolecules, vol. 27, pp. 5520–5522, 1994.
Teuben et al., J. Am. Chem. Soc. (1993), 115, 4931–4932.
R. Gomez et al., J. Organomet Chem., vol. 491, 1995, pp. 153–158.
A. Chernega et al., J. Chem. Soc. Chem. Commun., 1993, pp. 1415–1417.

Primary Examiner—Glenn A. Caldarola
Assistant Examiner—J. Pasterczyk
Attorney, Agent, or Firm—Keil & Weinkauf

[57] ABSTRACT

Catalyst systems which are suitable for the polymerization of olefinically unsaturated hydrocarbons contain, as active components, A) an amidinato metal complex of the formula A

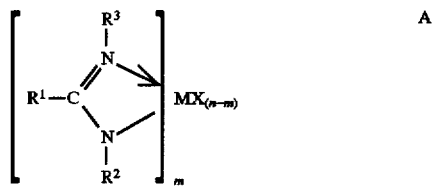

where M is a metal from group IIIb, IVb, Vb or VIb of the Periodic Table of Elements or a metal from the lanthanide group, X is a negative leaving atom or a negative leaving group, and the radicals X may be identical or different if (n–m)>1, $R^1$, $R^2$ and $R^3$ are each a C-organic or Si-organic radical, n is the valency of M in the metal complex A and m is from 1 to 5, with the proviso that n–m≥0, and, B) an activator in a molar ratio of activator B to metal complex A of from 0.5:1 to 10,000:1.

7 Claims, No Drawings

AMIDINATO CATALYST SYSTEMS FOR THE POLYMERIZATION OF OLEFINS

BACKGROUND OF THE INVENTION

1. Field of the Invention

The present invention relates to catalyst systems which are suitable for the polymerization of olefinically unsaturated hydrocarbons and contain, as active components, A) an amidinato metal complex of the formula A

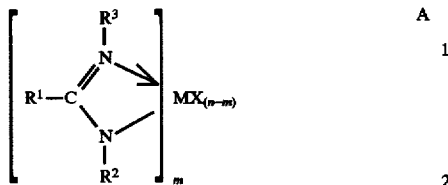

where

M is a metal from group IIIb, IVb, Vb or VIb of the Periodic Table of Elements or a metal from the lanthanide group, X is a negative leaving atom or a negative leaving group, and the radicals X may be identical or different if (n–m)>1, $R^1$, $R^2$ and $R^3$ are each a C-organic or Si-organic radical, n is the valency of M in the metal complex A and m is from 1 to 5, with the proviso that n–m≧0, and, B) an acceptor compound for the substituent X of the component A as an activator.

The present invention furthermore relates to the use of the catalyst systems for the preparation of polymers from olefinically unsaturated hydrocarbons, and the polymers obtainable thereby.

2. Description of the Related Art

The polymerization of olefins with the aid of Ziegler-Natta catalysts has in general long been known. These are in general complex systems comprising an organoaluminum compound on the one hand and at least one organometallic compound of a transition metal, in particular a titanium compound, on the other hand, which can be formed in situ from the components. Many systems of this type have been described to date and some are also known to have been used on a large industrial scale, especially for the production of polyethylene.

However, none of these systems is free from one disadvantage or another; either their components are very difficult to prepare, the systems or their components are extremely sensitive to oxygen and water or their solubility in organic solvents is only low so that they are difficult to meter.

Teuben et al., J. Am. Chem. Soc. (1993), 115, 4931–4932, describe the dimerization of alkynes with a bisbenzamidinatoyttrium complex. They mention in passing the polymerization of ethylene with this complex, but in the absence of organoaluminum compounds.

Furthermore, Green et al., J. Chem. Soc., Chem. Commun. (1993), 1415–1417, disclose specific benzamidinato complexes of the formula

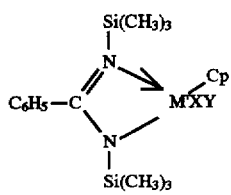

where

M' is Ti, Zr or Hf,

X and Y are each Cl or benzyl, and

Cp is cyclopenadienyl, which were used together with methylaluminoxane for the polymerization of ethylene. However, owing to the cyclopentadienyl group being bonded by a coordinate bond, these complexes are difficult to obtain and are furthermore highly sensitive, so that they are virtually unsuitable for industrial purposes.

SUMMARY OF THE INVENTION

It is an object of the present invention to provide novel catalyst systems for the polymerization of olefinically unsaturated hydrocarbons, which systems have the stated disadvantages only to a small extent, if at all, and are universally applicable.

We have found that this object is achieved by the catalyst systems defined at the outset. We have also found the use of the catalyst systems for the preparation of polymers of unsaturated hydrocarbons, processes for the preparation of polymers of unsaturated hydrocarbons with the aid of these catalyst systems and the polymers obtainable thereby.

DESCRIPTION OF THE PREFERRED EMBODIMENTS

The central atom M in A is primarily a metal of group IVb of the Periodic Table of Elements, ie. titanium, hafnium or very particularly zirconium. Metals of group Vb of the Periodic Table of Elements, such as vanadium, niobium and tantalum, and those of group VIb of the Periodic Table, such as chromium, molybdenum and tungsten, may also act as the central atom, chromium being particularly preferred. Examples of lanthanide metals are the metals having atomic numbers 57 to 71, for example lanthanum, cerium, praseodymium, neodymium, samarium, europium, gadolinium, thulium and lutetium. The metals of subgroup IIIb of the Periodic Table, such as scandium and yttrium, are also suitable.

As is generally known with regard to the function of Ziegler-Natta catalysts, a substituent is detached from the metal of one component and is taken up by the other component with formation of a coordinate unsaturated transition metal alkyl or transition metal hydride compound. Olefinic monomers are then inserted by the insertion polymerization mechanism into the transition metal-C or transition metal-H bond activated in this manner. Accordingly, in the present case the substituents X generally perform the function of being readily abstracted from the central metal M and taken up by the component B). The radicals X are therefore atoms or groups of atoms which can be transferred as anionic leaving groups to the component B). However, X may also permit binding of the metal complex A to the surface of an oxide carrier, for example by substitution of X for surface OH groups. The nature of these radicals in other respects is therefore unimportant or only of minor importance.

Examples of radicals X are:
hydrogen, halogen, such as fluorine, bromine, iodine and preferably chlorine, and anions of inorganic acids, such as nitrate, sulfate, perchlorate, phosphate, carbonate, dihydrogen sulfate and bicarbonate. Anions of organic acids, such as acetate, trifluoroacetate, trichloroacetate, benzoate, trifluoromethylsulfonate, methylsulfonate and p-toluenesulfonate, are also suitable. Other examples are alcoholates and thiolates such as methanolate, ethanolate, n-propanolate, isopropanolate, phenolate, thiophenolate, trifluoromethylphenolate, naphtholate and silanolate. X is furthermore particularly preferably an aliphatic $C_1$–$C_{10}$-alkyl radical, in particular methyl, ethyl, propyl, isopropyl, butyl, isobutyl, sec-butyl, tert-butyl, pentyl or hexyl, or vinyl, allyl or pentadienyl, or an alicyclic $C_3$–$C_{12}$-hydrocarbon radical, such as cyclopropyl, cyclobutyl, cyclopentyl or in particular cyclopentadienyl, cyclohexyl or $C_5$–$C_{20}$-bicycloalkyl, such as bicyclopentyl, or in particular bicycloheptyl or bicyclooctyl. Examples of substituents X having aromatic structural units are $C_6$–$C_{15}$-aryl, preferably phenyl, or naphthyl or indenyl, fluorenyl or benzindenyl, alkylaryl or arylalkyl, each having 1 to 10 carbon atoms in the alkyl radical and 6 to 20 carbon atoms in the aryl radical, for example tolyl or benzyl.

$R^1$ to $R^3$ are each C- or Si-organic groups, such as $C_1$–$C_{10}$-alkyl, preferably methyl, ethyl, propyl, isopropyl, butyl, isobutyl, sec-butyl or tert-butyl. $R^1$ to $R^3$ may furthermore be a 3-membered to 12-membered cycloalkyl radical, which in turn may carry $C_1$–$C_{10}$-alkyl as substituents. Preferred cycloalkyl radicals are cyclopropyl, cyclobutyl, cyclopentyl and in particular cyclohexyl. Bicyclic $C_5$–$C_{20}$ radicals, such as norbornyl, are also used. $R^1$ to $R^3$ may each furthermore be a group of atoms having aromatic structural units, such as $C_6$–$C_{20}$-aryl, preferably phenyl, tolyl, naphthyl or biphenyl, or alkylaryl or arylalkyl, each having 1 to 10 carbon atoms in the alkyl radical and 6 to 20 carbon atoms in the aryl radical, for example tolyl or benzyl. $R^1$ to $R^3$ may each furthermore be an Si-organic radical, such as $Si(R^4)_3$, where $R^4$ is $C_1$–$C_{10}$-alkyl, preferably methyl, ethyl, propyl, isopropyl, butyl, isobutyl, sec-butyl, tert-butyl, or $C_3$–$C_{12}$-cycloalkyl, preferably cyclopropyl, cyclobutyl, cyclopentyl or in particular cyclohexyl. $R^4$ may also be $C_5$–$C_{20}$-bicycloalkyl, preferably bicycloheptyl or bicyclooctyl. Moreover, $R^1$ to $R^3$ may each be a group of atoms having aromatic structural units, such as $C_6$–$C_{20}$-aryl, preferably phenyl or naphthyl, or alkylaryl or arylalkyl, each having 1 to 10 carbon atoms in the alkyl radical and 6 to 20 carbon atoms in the aryl radical, for example tolyl or benzyl.

If the central atom M carries two amidinato ligands, these ligands may furthermore be linked to one another by the radicals $R^1$ to $R^3$. Suitable bridge members are $C_1$–$C_6$-alkylene bridges or diorganosilyl bridges, for example dimethylsilyl, diethylsilyl or diphenylsilyl, or mixed $C_1$–$C_6$-alkylene/diorganosilyl bridges, for example —$CH_2$—$Si(CH_3)_2$—$CH_2$— or —$Si(CH_3)_2$—$CH_2$—$Si(CH_3)_2$—.

Particularly suitable compounds of the general formula A are those in which $R^1$ is bonded to the amidinate carbon atom of the complex A via a carbon atom which carries only carbon atoms as neighboring substituents, for example a tertiary aliphatic or an aromatic carbon atom. Other particularly suitable complexes are those in which $R^2$ and $R^3$ are trialkylsilyl substituents.

The preparation of the compounds A is disclosed, for example, in K. Dehnicke, Chemikerzeitung, 114 (1990), 295–304.

In a preferred process for the preparation of A, a nitrile $R^1$—CN is reacted with an organosilicon alkali metal amide in an ether, preferably diethyl ether or tetrahydrofuran, as a solvent at from −80° to 100° C. and the resulting alkali metal amidinate is reacted with a transition metal chloride at from −80° to 100° C.

In addition to the amidinato complexes A, the novel catalyst systems may also contain activators B) which are known per se and are also referred to as cocatalysts in the literature. In general, they alkylate the transition metal component A of the catalyst system and/or abstract a ligand X from the transition metal component, finally permitting the formation of a catalyst system for the polymerization of olefinically unsaturated hydrocarbons. In general, organometallic compounds of main groups 1 to 3 or group IIb of the Periodic Table are suitable for this task, but other acceptor compounds, for example carbocation salts, may also be used.

Particularly suitable activator compounds are lithium organyls, aluminum organyls, boronorganyls and carbocation salts. Open-chain or cyclic alumoxane compounds, which can be obtained according to U.S. Pat. No. 4,794,096 by reacting trialkylaluminums with water, are preferred. They are composed of from 5 to 30 structural units –[O—Al($R^6$)–]–which are bonded in the form of a chain or ring and in which $R^6$ is $C_1$–$C_4$-alkyl, preferably methyl or ethyl. The alumoxane compounds may also be present as a mixture with other metal alkyls, preferably with alkylaluminiums.

Aluminum organyls of the general formula $Al(R^5)_3$, where $R^5$ is hydrogen or $C_1$–$C_{10}$-alkyl, preferably $C_1$–$C_4$-alkyl, in particular methyl, ethyl or butyl, are also used. $R^5$ may furthermore be arylalkyl or alkylaryl, each having 1 to 10 carbon atoms in the alkyl radical and 6 to 20 carbon atoms in the aryl radical. Other suitable aluminum alkyls $Al(R^5)_3$ are those in which $R^5$ may be fluorine, chlorine, bromine or iodine, with the proviso that at least one radical $R^5$ is a C-organic radical or hydrogen. Particularly preferred compounds are trimethylaluminum, triethylaluminum, triisobutylaluminum, diisobutylaluminum hydride and diethylaluminum chloride.

Other suitable activators are organoboron compounds, for example trisarylboron compounds, preferably tris(pentafluorophenyl)boron, and salts of carbonium ions, preferably triphenylmethyl tetraarylborate, in particular triphenylmethyl tetra(pentafluorophenyl)borate.

Lithium organyls are particularly suitable when chromium-containing metal complexes A are used. Alkyl- and aryllithium compounds, in particular n-butyllithium, are especially suitable.

The stated Al, Li, B or C compounds are known or are obtainable in a manner known per se.

The activators can be used alone or as mixtures in the catalyst system.

The activator component B) is preferably used in a molar excess, based on the metal complex A.

The molar ratio of activator B) to metal complex A is preferably from 0.5:1 to 10,000:1, in particular from 1:1 to 5000:1.

The components of the novel catalyst systems may be introduced into the polymerization reactor individually in any order or as a mixture. Preferably, the amidinato complex is preactivated with at least one novel activator component before entering the reactor.

A particular advantage of the novel catalyst systems is their very good solubility in organic solvents, such as aliphatic or aromatic hydrocarbons, eg. hexane, heptane, toluene and the xylenes, and ethers, such as tetrahydrofuran.

However, the novel catalysts may also be used in solid form by applying them, for example, to a substrate. This is advantageously done by means of the impregnation method. Here, the substrate, for example silica gel, alumina or polymer granules, is suspended in a solution of the novel catalyst in an organic solvent, such as a hydrocarbon or ether, after which the solvent is evaporated. Application to the carrier is effected preferably at room temperature. The catalyst may also be subsequently activated by calcination in an inert gas stream at from 100° to 900° C.

With the aid of these catalyst systems, polymers (homo- and copolymers) of olefinically unsaturated hydrocarbons, preferably ethylene or 1-alkenes, such as propene, 1-butene, 1-pentene, 1-hexene, 4-methyl-1-pentene, styrene and its derivatives, cycloolefins, for example norbornene or norbornadiene, 1,3-butadiene, 1,4-hexadiene and 1,5-hexadiene may be prepared.

The preparation of these polymers can be carried out in the conventional reactors used for the polymerization of olefins, either batchwise or, preferably, continuously. Suitable reactors include continuously operated stirred kettles, and a plurality of stirred kettles connected in series may also be used. Owing to their ready solubility and meterability, the novel catalysts are particularly suitable for use in high pressure polymerization processes and solution polymerization processes.

The polymerization conditions as such are not critical. Pressures of from 1 to 3500, preferably from 1 to 3000, in particular from 10 to 100, bar and temperatures of from −50° to 400° C., preferably from −20° to 250° C., in particular from 10° to 150° C., have proven suitable.

Polymerization reactions with the aid of the novel catalyst systems can be carried out in the gas phase, in suspension, in liquid and in supercritical monomers and in inert solvents. In the case of polymerization in solvents, in particular liquid hydrocarbons, such as heptane or toluene, are used.

The average molecular weight of the resulting polymers can be controlled by the methods usually used in polymerization technology, for example by adding a regulator, such as hydrogen, or by changing the polymerization temperature. It is possible to prepare both polymers having relatively high molecular weights and, by increasing the polymerization temperature and/or feeding in hydrogen, those having relatively low molecular weights. If polymerization is carried out in the absence of hydrogen, polymers having terminal double bonds are generally obtained.

EXAMPLES

Preparation of polyethylene

Examples 1 to 3

Ethylene was passed for 60 minutes, at 50° C. and 1 bar, into a solution of 1000 ml of toluene, a mg of a complex A and b ml of a 10% strength by weight solution of methylaluminoxane (MAO) in toluene. The resulting polymers were precipitated with methanolic hydrochloric acid and purified in the usual manner. The intrinsic viscosity was determined according to DIN 53733. The molecular weights Mw and Mn and their distribution were determined by gel permeation chromatography (GPC) in 1,2,4-trichlorobenzene at 135° C. (polyethylene standard).

The following metal complexes were used:

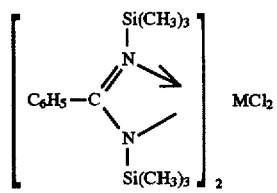

1: M=Zr
2: M=Ti

Details of these experiments and the results thereof are shown in the table below.

| Ex. | Complex A | mg A | MAO [ml] | Al:M | Yield [g] | Intrinsic viscosity [dl/g] | Mw/Mn |
| --- | --- | --- | --- | --- | --- | --- | --- |
| 1 | 1 | 11.5 | 10 | 1000:1 | 1.6 | 7.19 | 91 |
| 2 | 1 | 11.5 | 50 | 5000:1 | 1.9 | 6.25 | 28 |
| 3 | 2 | 53.9 | 50 | 1000:1 | 0.3 | 4.34 | 27 |

Examples 4 and 5

Bis[N,N'-bis(trimethylsilyl)benzamidinato]chromium(II) was prepared as described in F. T. Edelmann, Z. Naturforsch. 46 b (1991), 1328–1332.

2.08 g of this compound were dissolved at 20° C. in 25 ml of pure heptane flushed with argon and were added to a suspension of 12.8 g of silica gel, which had been calcined for 24 hours at 800° C. in a stream of argon, in heptane. This mixture was stirred for 2 hours at room temperature, after which the solid was filtered off and dried for 4 hours at room temperature under reduced pressure. The filtrate was only weakly colored, which indicated that the chromium compound was irreversibly adsorbed onto the carrier. The supported catalyst complex thus prepared was in the form of a free-flowing brown solid.

400 ml of isobutane to which 30 mg of a metal alkyl (component B)) had been added were introduced into a 1 l autoclave. At 90° C., ethylene was introduced to a total pressure of 40 bar so that the equilibrium concentration of the ethylene in the liquid phase was 26 mol %. 150 mg of the supported catalyst complex were then metered into the autoclave in each case. When the polymerization began, ethylene was introduced continuously so that the reaction conditions (90° C., 40 bar total pressure) remained constant. After 90 minutes, the polymerization was terminated.

Details of these examples and the results thereof are shown in the table below.

The intrinsic viscosity [η] was determined according to DIN 53 733.

| Ex. | Component B) | Polyethylene yield [g] | [η] [dl/g] |
| --- | --- | --- | --- |
| 4 | Triethylaluminum Molar ratio Al:Cr = 4:1 | 3.0 | 12.3 |
| 5 | n-Butyllithium Molar ratio Li:Cr = 8:1 | 3.7 | 5.8 |

We claim:

1. A catalyst which is suitable for the polymerization of olefinically unsaturated hydrocarbons and contains, as active components, A) an amidinato metal complex of the formula A

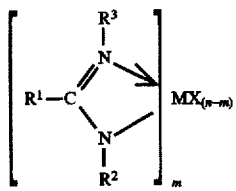

where
- M is a metal from group IIIb, IVb, Vb or VIb of the Periodic Table of Elements or a metal from the lanthanide group,
- X is a negative leaving atom or a negative leaving group, and the radicals X may be identical or different if $(n-m)>1$,
- $R^1$, $R^2$ and $R^3$ are each a C-organic or Si-organic radical,
- n is the valency of M in the metal complex A and
- m is from 1 to 5, with the proviso that $n-m \geq 0$, and, B) an acceptor compound for the substituent X of the component A as an activator in a molar ratio of activator B to metal complex A of from 0.5:1 to 10,000:1.

2. A catalyst as defined in claim 1, in which M is a metal of group IVb of the Periodic Table of Elements.

3. A catalyst as defined in claim 1, in which M is chromium.

4. A catalyst as defined in claim 1, in which $R^1$ in the complex A is a tertiary or aromatic hydrocarbon radical.

5. A catalyst as defined in claim 1, in which $R^2$ and $R^3$ in the complex A are each trialkylsilyl.

6. A catalyst as defined in claim 1, in which the component B) is an aluminum compound having at least one Al—C or Al—H bond, an organoboron compound, an organolithium compound or a carbocation salt.

7. A catalyst as defined in claim 1, which is applied to an oxide carrier.

* * * * *